United States Patent
Bartos et al.

(10) Patent No.: US 10,264,005 B2
(45) Date of Patent: Apr. 16, 2019

(54) IDENTIFYING MALICIOUS NETWORK TRAFFIC BASED ON COLLABORATIVE SAMPLING

(71) Applicant: Cisco Technology, Inc., San Jose, CA (US)

(72) Inventors: Karel Bartos, Prague (CZ); Martin Rehak, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 170 days.

(21) Appl. No.: 15/403,365

(22) Filed: Jan. 11, 2017

(65) Prior Publication Data

US 2018/0198811 A1    Jul. 12, 2018

(51) Int. Cl.
*H04L 29/06* (2006.01)

(52) U.S. Cl.
CPC ........ *H04L 63/1425* (2013.01); *H04L 63/302* (2013.01); *H04L 2463/121* (2013.01); *H04L 2463/144* (2013.01)

(58) Field of Classification Search
CPC .................................................. H04L 63/1425
USPC .......................................................... 726/23
See application file for complete search history.

(56) References Cited

U.S. PATENT DOCUMENTS

| | | |
|---|---|---|
| 6,088,804 A | 7/2000 | Hill et al. |
| 7,159,237 B2 | 1/2007 | Schneier et al. |
| 7,178,166 B1 | 2/2007 | Taylor et al. |
| 7,278,160 B2 * | 10/2007 | Black .................. H04L 63/1425 709/223 |
| 7,761,917 B1 | 7/2010 | Kumar |
| 7,930,752 B2 | 4/2011 | Hertzog et al. |
| 8,201,257 B1 | 6/2012 | Andres et al. |
| 8,204,984 B1 | 6/2012 | Aziz et al. |
| 8,448,247 B2 | 5/2013 | Stute |
| 8,539,582 B1 | 9/2013 | Aziz et al. |
| 8,826,438 B2 | 9/2014 | Perdisci et al. |
| 9,432,393 B2 | 8/2016 | Bartos et al. |
| 9,438,620 B2 | 9/2016 | Aktas et al. |
| 2006/0272018 A1 * | 11/2006 | Fouant ................ H04L 63/1416 726/23 |

(Continued)

OTHER PUBLICATIONS

Gu et al., "BotSniffer: Detecting Botnet Command and Control Channels in Network Traffic", 16th Annual Network & Distributed System Security Symposium, San Diego, CA, Feb. 2008, 18 pages.

(Continued)

*Primary Examiner* — Longbit Chai
(74) *Attorney, Agent, or Firm* — Edell, Shapiro & Finnan, LLC

(57) ABSTRACT

Identifying malicious network traffic based on distributed, collaborative sampling includes, at a computing device having connectivity to a network, obtaining a first set of data flows, based on sampling criteria, that represents network traffic between one or more nodes in the network and one or more domains outside of the network, each data flow in the first set of data flows including a plurality of data packets. The first set of data flows is forwarded for correlation with a plurality of other sets of data flows from other networks to generate global intelligence data. Adjusted sampling criteria is generated based on the global intelligence data and a second set of data flows is obtained based on the adjusted sampling criteria.

20 Claims, 8 Drawing Sheets

(56) References Cited

U.S. PATENT DOCUMENTS

2014/0282808 A1 9/2014 Beals et al.
2015/0373043 A1 12/2015 Wang et al.
2015/0381649 A1 12/2015 Schultz et al.

OTHER PUBLICATIONS

Mai et al., "Is Sampled Data Sufficient for Anomaly Detection?", Oct. 25-27, 2006, Rio de Janeiro, Brazil, ICM '06, Proceedings of the 6th ACM SIGCOMM conference on Internet measurement, 12 pages.
Hohn et al., "Inverting Sampled Traffic", IMC '03, Proceedings of the 3rd ACM SIGCOMM conference on Internet measurement, Oct. 27-29, 2003, Miami Beach, FL, 12 pages.
Androulidakis et al., "Network anomaly detection and classification via opportunistic sampling" Network, IEEE, vol. 23, Issue 1, Jan.-Feb. 2009, 7 pages.
Carela-Espanol et al., "Analysis of the impact of sampling on NetFlow traffic classification", Computer Networks, vol. 55, Issue 5, Apr. 1, 2011, 32 pages.
Maiya et al., "Benefits of Bias: Towards Better Characterization of Network Sampling", KDD '11, Proceedings of the 17th ACM SIGKDD international conference on Knowledge discovery and data mining, Aug. 21-24, 2011 San Diego, CA, 9 pages.
Shomorony et al., "Sampling Large Data on Graphs", Signal and Information Processing (GlobalSIP), 2014 IEEE Global Conference, Dec. 3-5, 2014, Atlanta, GA, 4 pages.
Bartos et al., "Towards Efficient Flow Sampling Technique for Anomaly Detection", Traffic Monitoring and Analysis, 4th International Workshop, TMA 2012, Vienna, Austria, Mar. 12, 2012, 14 pages.

* cited by examiner

IDENTIFYING MALICIOUS NETWORK TRAFFIC BASED ON COLLABORATIVE SAMPLING

TECHNICAL FIELD

The present disclosure relates to network security.

BACKGROUND

The steady increase in network traffic and the increased complexity of transactions (due at least in part to the delivery of critical services from cloud data centers) has increased the difficulty of monitoring network traffic for a particular network. In fact, it is now nearly impossible to monitor all traffic for a particular network. Consequently, monitoring is frequently performed by sampling network traffic. There are two basic classes of sampling techniques: packet-based and flow-based. Packet-based sampling methods work on the level of network packets. Each packet is selected for monitoring with a predefined probability depending on the sampling method used. In flow-based sampling, the monitored traffic is aggregated into network flows and the sampling itself is applied to the whole flow, not to the particular packets.

Unfortunately, random sampling in accordance with either of these sampling techniques may miss at least some malicious network traffic, which may be extremely problematic. For example, malicious botnets, which are one of the most potent threats to networking systems, are often difficult to detect since malicious botnets often use different technologies, such as Domain Generation Algorithm (DGA), to essentially hide a Command & Control server that is used by a botnet's originator (or "bot master") to control the botnet entities (bots) remotely. If a malicious botnet is established without detection, the malicious botnet may deploy a platform for performing malicious activities such as denial-of-service (DoS) attacks, information gathering, distributed computing, cyber fraud, malware distribution, unsolicited marketing, etc. Similar attacks may also be deployed by viruses, worms, and other such malware if these attacks enter a network undetected (i.e., if the network traffic associated with these attacks, which is referred to herein as malicious network traffic, is not included in a sample).

DESCRIPTION OF EXAMPLE EMBODIMENTS

Overview

Figure 1A:
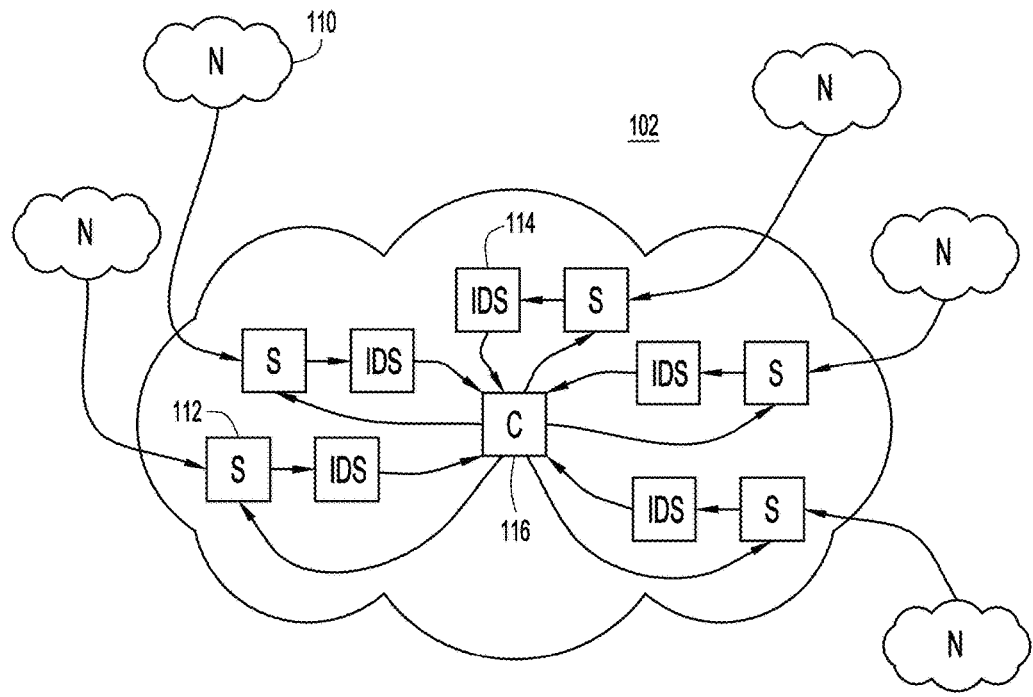
FIGS. 1A-1D are diagrams illustrating a networking environment in which the techniques presented herein may be employed, according to an example embodiment.

Techniques are provided herein for identifying malicious network traffic based on collaborative sampling. These techniques may be embodied as a method, a system, and instructions in a computer-readable storage media to perform the method. According to at least one example embodiment, identifying malicious network traffic based on collaborative sampling includes, at a computing device having connectivity to a network, obtaining a first set of data flows, based on sampling criteria, that represents network traffic between one or more nodes in the network and one or more domains outside of the network, each data flow in the first set of data flows including a plurality of data packets. The first set of data flows is forwarded for correlation with a plurality of other sets of data flows from other networks to generate global intelligence data. Adjusted sampling criteria is generated based on the global intelligence data and a second set of data flows is obtained based on the adjusted sampling criteria.

Example Embodiments

Presented herein are techniques for identifying malicious network traffic based on collaborative sampling. The sampling is referred to as "collaborative sampling" because the sampling is based on input or feedback from many networks working together or collaborating. Generally, the collaborative sampling techniques presented herein adaptively reduce high volumes of the network traffic to generate a sample that has a size suitable for analysis and detection of malicious activity. That is, the collaborative sampling techniques effectively and efficiently sample network traffic of any individual network that is participating in a network collaboration. Moreover, the techniques presented herein can be deployed as a full-cloud solution or as an on-premises and cloud hybrid. Regardless of how the techniques presented herein are deployed, the techniques allow advanced (i.e., computationally intensive) and sophisticated detection algorithms (which typically cannot be applied to full telemetries) to be employed for network security with minimal negative impact on the overall efficacy of the network security (i.e., as compared to a computationally intensive approach monitoring all network activity). Consequently, the techniques presented herein enable significant economies of scale while also enabling efficient data collection from various networks.

More specifically, the collaborative sampling techniques sample network traffic of a particular network based on a combination of statistical properties of the network traffic at the particular network and global knowledge or intelligence that is acquired by correlating sampled network traffic, particular features of sampled traffic, and known properties of malicious traffic from multiple collaborating networks (i.e., multiple enterprise networks). If a particular attack is identified at a first network and/or a particular feature of network traffic is found to be associated with a malicious domain at a first network (i.e., by an intrusion detection system (IDS) operating at or in association with the first network), these discoveries may be instantaneously propagated to any other collaborating networks (i.e., any networks participating in a network security collaboration, such as clients of a particular network security vendor) to automatically adjust sampling of all collaborating networks. That is, the techniques presented herein provide global threat visibility and automatic adjustments based on intelligence feedback. Put another way, the techniques presented herein allow network traffic of any collaborating network to be sampled based on global intelligence data that is shared and collectively updated by any of the individual collaborating networks. Consequently, the global intelligence data summarizes or collectively represents intrusion intelligence data from any of the individual collaborating networks, thereby automatically decreasing global re-usability of novel attacks that have been used to target any of the collaborative networks (at least globally within the collaborating networks).

One challenge with generating global intelligence based on input data from multiple networks is privacy. However, the techniques provided herein may resolve privacy issues by completely anonymizing and obfuscating all sensitive information before sharing data (i.e., before network data is delivered as an input to create the global intelligence). Moreover, as is discussed in further detail below, the techniques provided herein only utilize a limited (but still very valuable) amount of metadata, such as a list of detected malicious Internet domains, server IP addresses, autonomous systems, or feature vectors (numbers) describing the detected behaviors. This data does not contain any host/user-specific information, but can be used to advantageously adapt the sampling rate.

Figure 1B:
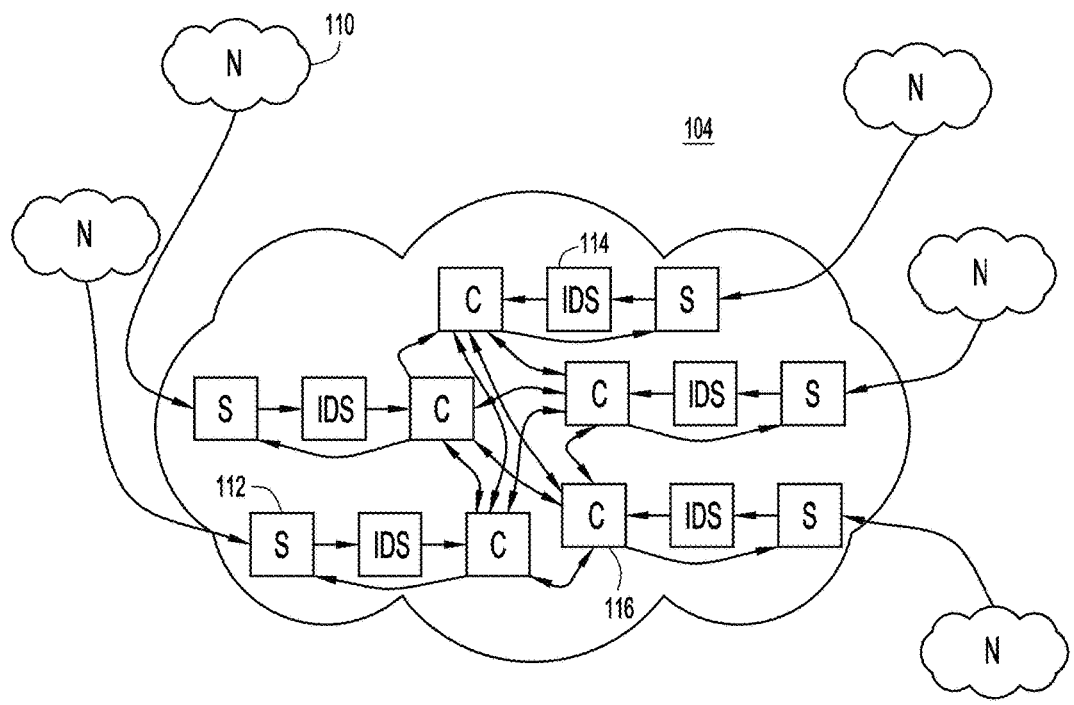
Figure 1C:
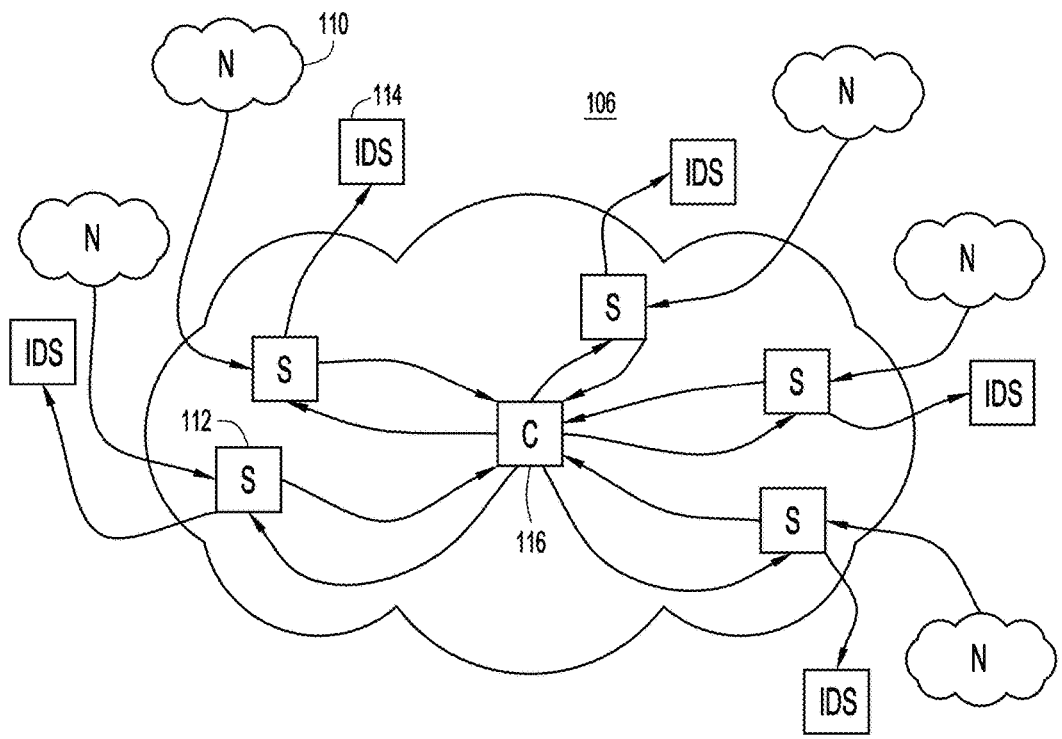
Figure 1D:
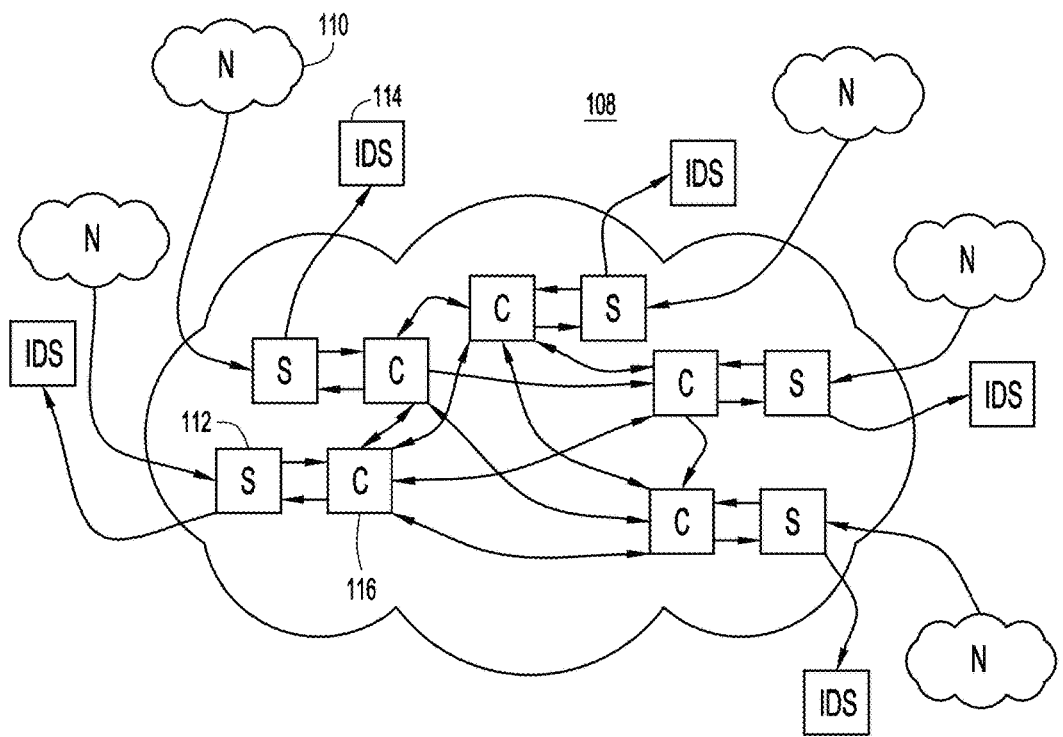

Now referring to FIGS. 1A-1D for a description of network environments in which the techniques presented herein may be employed, according to example embodiments. Generally, the techniques presented herein are quite flexible and can be deployed with different architectures to satisfy different security requirements and environment restrictions. For example, the techniques presented herein can be deployed with a centralized or fully-distributed architecture that is fully integrated in the cloud or incorporates off-cloud (i.e., on-premises) components, systems, or subsystems. The different network environments depicted in FIGS. 1A-1D depict four example implementations; but these implementations are merely examples and combinations or portions of two or more of these implementations could also be utilized to implement the techniques presented herein. More specifically, FIG. 1A depicts an implementation 102 that is centralized and fully cloud-based while FIG. 1B depicts an implementation 104 that is fully distributed and fully cloud-based. By comparison, FIG. 1C depicts an implementation 106 that is centralized and utilizes or incorporates on-premises IDS's 112 from each network, and FIG. 1D depicts an implementation 108 that is fully distributed and utilizes or incorporates on-premises IDS's 114. As an example of a further implementation, the techniques presented herein could also be implemented in a partially-centralized architecture, with some cloud-integrated IDS's and some off-cloud (i.e., on-premises) IDS's.

In each of these implementations (i.e., implementation 102, implementation 104, implementation 106, and implementation 108), multiple collaborative networks 110 (shown with the label "N") are interconnected by a series of components, systems, or subsystems, including sampling systems/subsystems 112 (shown with the label "S"), IDS's 114, and collaboration systems/subsystems 116 (shown with the label "C"). The sampling systems 112 are configured to supply samples of network traffic from each of the collaborative networks 110 to an associated IDS 114 or collaboration system 116. Consequently, the sampling systems 112 (also referred to herein as sampling subsystems 112) are configured to ensure that each IDS 114 or collaboration system 116 does not receive an amount of data that exceeds a predefined limit for processing. The operations and hardware of example sampling systems 112 are described in further detail below in connection with FIGS. 3, 4, and 7.

Still referring to FIGS. 1A-1D, in order to provide a sample that contains as much relevant data as possible, the sampling criteria for a particular sampling system 112 (i.e., parameters of sampling) at a particular collaborative network 110 are adjusted based on feedback from other collaborative networks 110 in the network environment. As is described in further detail below, this feedback is supplied to the sampling systems 112 in the form of global intelligence data, which is generated by the collaboration system(s) 116. The collaboration system(s) 114 may be configured to interact with every network 110 (i.e., by way of a sampling system 112 or IDS 114) and, thus, when the collaboration system 116 is full distributed, the collaboration system 116 includes components or subsystems that are associated with each network 110 on a one-to-one basis (i.e., in implementation 104 and implementation 108) and configured to constantly communicate and update each other. By comparison, when the collaboration system 116 is configured as a centralized system (i.e., in implementation 102 and implementation 106) the centralized system is configured to interact with all of collaborating networks 110. Consequently, information about newly discovered attacks (global intelligence data) can automatically, simultaneously spread across all the intrusions detection systems 114, whether located on-premises (i.e., in implementation 106 and implementation 108) or in the cloud (i.e., in implementation 102 and implementation 104) to provide global threat visibility.

More specifically, in implementations utilizing or including off-cloud (i.e., on-premises) IDS's 114 (i.e., implementation 106 and implementation 108), raw data (i.e., data flows) is sampled at a sampling system 112 located in the cloud. The sampling system 112 applies collaborative sampling techniques, based at least in part on global intelligence data received from the collaboration system 116, to reduce the raw data to a required size. In some embodiments, the collaboration system 116 is fully centralized (i.e., implementation 106), but in other embodiments the collaboration system 116 is fully or partially distributed (a partially distributed collaboration system 116 may include one component or subsystem for groups of networks, instead of a one-to-one ratio). Regardless, once the collaboration system 116 provides the global intelligence data to a sampling system 112, the sampling system 112 may adaptively modify the sampling rate for each network flow (or other basic unit) individually based on the acquired global intelligence. Once a sample is generated, the sampled data (of required size) may be sent back to the on premises IDS 114 system for further analysis.

In implementations utilizing or including cloud-based IDS's 114 (i.e., implementation 102 and implementation 104), raw data (i.e., data flows) is also sent to a sampling system 112 located in the cloud that can adaptively modify the sampling rate for each individual network flow (or other basic unit) based on the acquired global intelligence from the collaboration system 116. However, when the IDS 114 is implemented in the cloud, the collaboration system 116 may also receive input from the IDS 114. More specifically, the sampled traffic is further analyzed by the IDS's 114 and the results are collected and correlated by the correlation system 116 into the global intelligence data. The global intelligence data can then be pushed back to the sampling systems 112 to adjust the sampling model according to the current state of the global intelligence. That is, the sampling systems 112 may adjust sampling criteria based on the global intelligence data.

Figure 6:
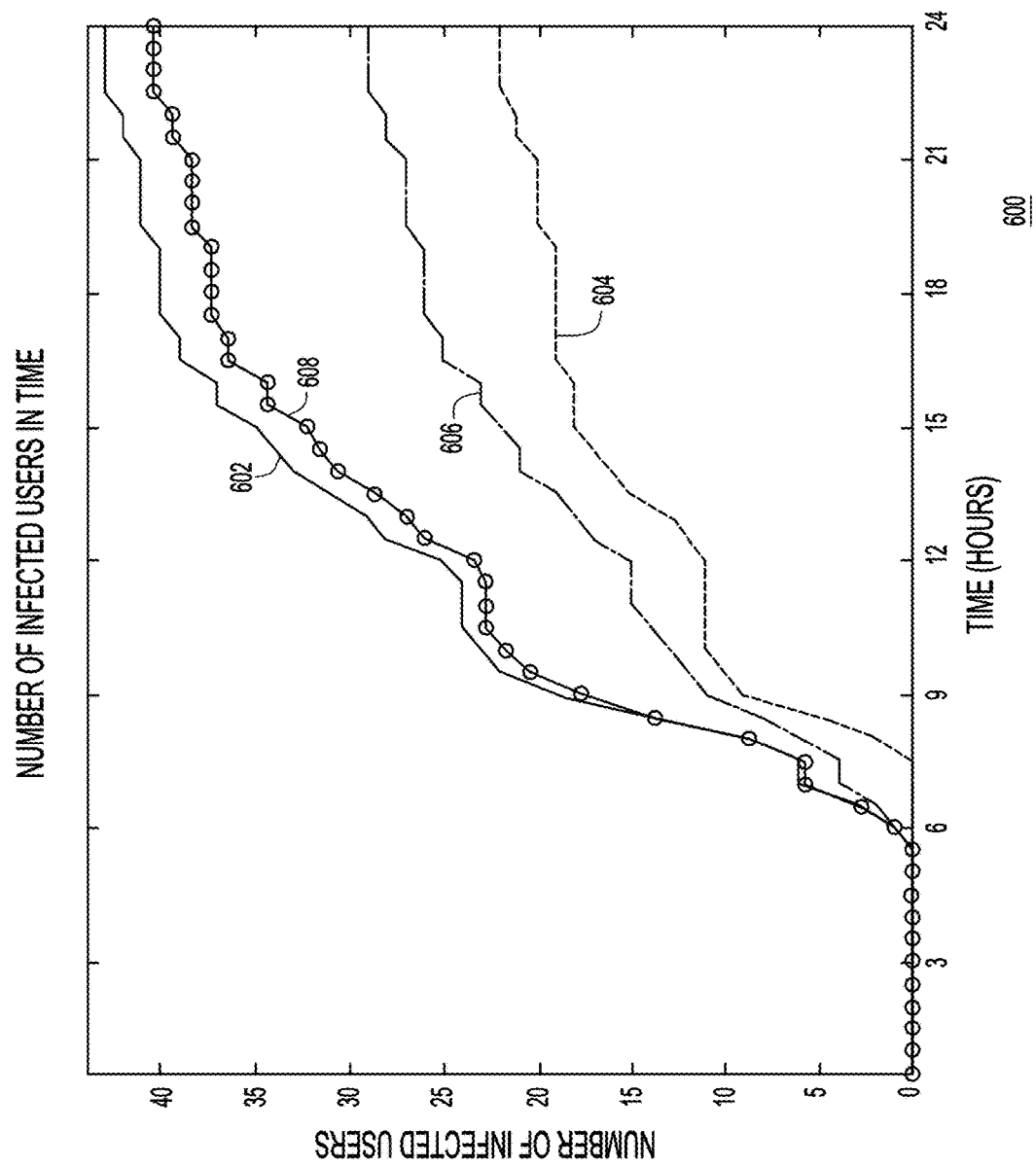
FIG. 6 is a diagram depicting malicious network traffic captured based on techniques presented herein in comparison to other sampling techniques.

Regardless of the architecture, a sample obtained based on global intelligence will include a large majority of malicious network traffic, as is shown in FIG. 6 and described further below, and thus, can be utilized for a wide variety of network security purposes. For example, if the sampling is monitored in real-time by an IDS 114, the sampling may provide precise detection and classification of network traffic (with precision increasing as more network traffic related to malicious activity is sampled). The IDS can then apply an action to identified malicious network traffic, such as blocking the traffic, blacklisting the originating domain, etc. The sampling techniques will provide fast adaptation, which is incredibly important in the current ever changing network threat landscape (i.e., because findings in one network can be immediately used for other networks). Additionally or alternatively, if the samples are analyzed for post mortem network forensics, the samples will provide significant data reduction, thereby enhancing the processing of these techniques (by reducing the time and resources required for this processing). For example, the samples can be used to improve the processing of command and control reconstruction with graph analysis.

Figure 2:
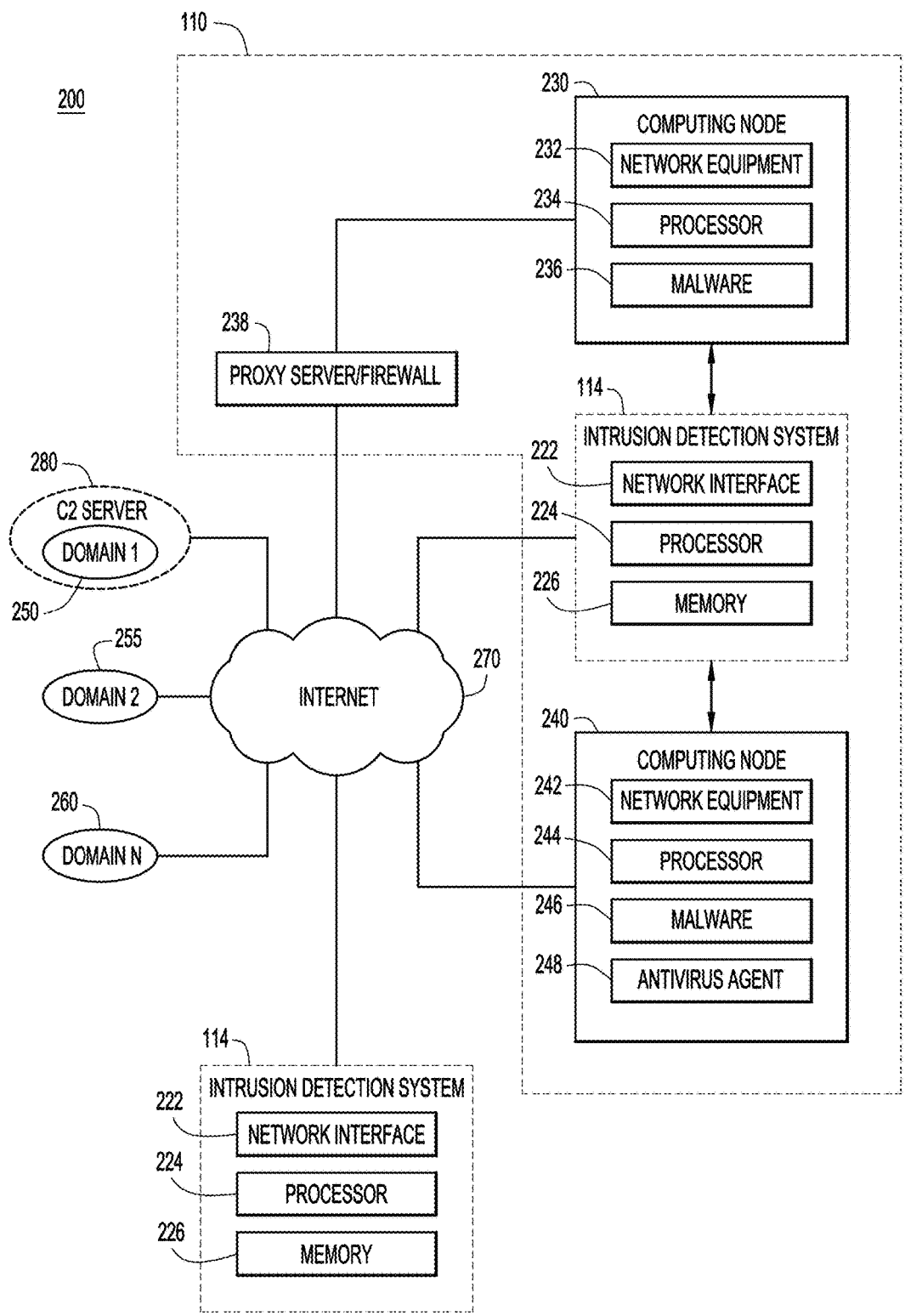
FIG. 2 is a block diagram illustrating a network from FIG. 1, according to an example embodiment.

Reference is now made to FIG. 2, which depicts a block diagram 200 of an example collaborative network 110 (from FIGS. 1A-1D). The network 110 includes a number of nodes, represented in FIG. 2 by node 230 and node 240 and may also include an IDS 114 (i.e., an on-premises IDS 114). However, as mentioned above, the IDS 114 may also be deployed in the cloud or independently of the cloud (i.e., off-cloud, such as on-premises) and, thus, the IDS 110 is shown either inside or outside of network 110. Regardless of its location, IDS 114 may include a network interface 222 configured to provide connectivity to the Internet 270 and a processor 224 configured to execute instructions stored in memory 226. The memory 226 may store intrusion intelligence data, such as policies or rules for network security and/or identifying malicious network traffic, as well as instructions for applying or implementing the intrusion intelligence data. That is, the IDS 114 may be configured to identify network intrusions (i.e., security violations) and may, in at least some instances, take actions when network intrusions are identified, such as blocking network traffic identified as malicious.

More generally, memory 226 may include read only memory (ROM), random access memory (RAM), magnetic disk storage media devices, optical storage media devices, flash memory devices, electrical, optical or other physical/tangible (i.e., non-transitory) memory storage devices. Thus, the memory 226 may be or include one or more tangible (non-transitory) computer readable storage media (i.e., a memory device) encoded with software comprising computer executable instructions. For example, memory 226 may store instructions that may be executed by processor 224 for detecting malicious network traffic in sampled traffic and/or generating intrusion intelligence data. In other words, memory 226 may include instructions, that when executed by one or more processors, cause the one or more processors to carry out operations of the IDS 114 described herein.

Still referring to FIG. 2, for simplicity, network 110 is only shown with two computing nodes (computing nodes 230 and 240); however, the network 110 may be any desirable size. For example, the network 100 may be a university network of any size, a corporate network of any size, or any other such network. However, it may be counterintuitive to utilize the techniques presented herein on small networks where all of the network traffic can be monitored with relatively few resources, since sampling would be rendered unnecessary. Computing node 230 and computing node 240 include network equipment 232 and network equipment 242, respectively, to provide connectivity to Internet 270 such that node 230 and node 240 may each connect to a number of domains outside of the network 110 via the Internet 270. For example, node 230 and node 240 may connects to domain 250, domain 255, and domain 260, at least one of which may be hosted by a malicious user or server, such as a Command & Control (C2) Server 280 (i.e., a botnet server), infected by malware, or otherwise used to generate malicious network traffic. In the depicted embodiment, network equipment 232 connects to the Internet 270 via a proxy server/firewall 238 while network equipment 242 connects directly to the Internet 270. The proxy server/firewall 238 stores proxy logs of network communications to Internet 270 that are established via proxy server/firewall 238. Computing node 230 may also include a processor 234 and computing node 240 includes a processor 244.

In FIG. 2, malware 236 resides and is executed on computing node 230 while malware 246 resides and is executed on computing node 240. As used herein, malware 236 and malware 246 refer to executable files that each cause a computer/processor to execute instructions. The malware may be in a machine language, interpreted language, intermediate language, script language or any other language now known or hereinafter developed that causes a computer/processor to execute instructions. For simplicity, only computing device 230 is connected to Internet 270 via proxy server 238. However, in other embodiments, network 110 may include, but is not limited to, a plurality of computing devices, servers and other network devices that may also be infected by malware. Similarly, for simplicity, only computing node 240 includes an antivirus agent 248 that can monitor activities at the computing node 240 and report the activities to generate data flows, but any computing nodes may also include an antivirus agent 248.

Figure 3:
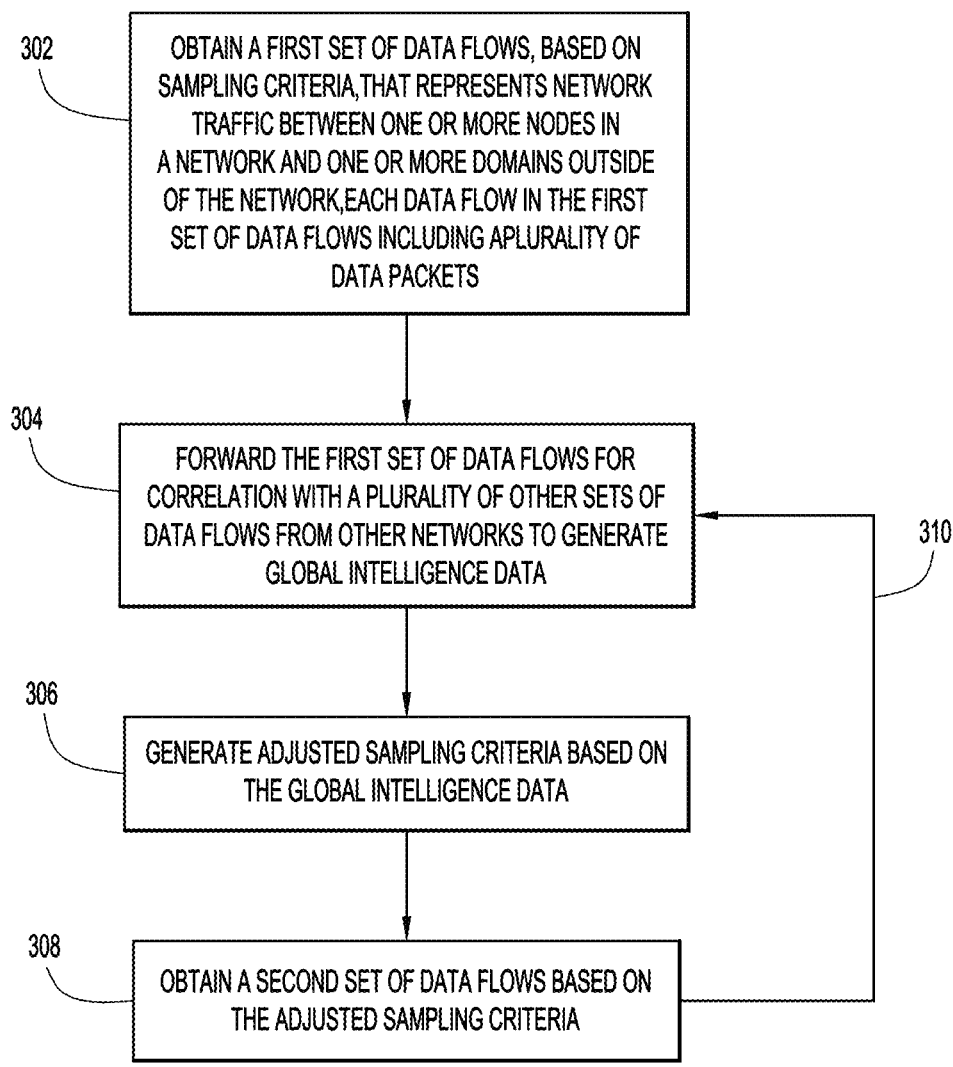
FIG. 3 is a high-level flowchart illustrating a method for identifying malicious network traffic based on collaborative sampling from the perspective of a sampling system, according to an example embodiment.

Now referring to FIG. 3, a high-level flowchart is now described of a method 300 for identifying malicious network traffic based on collaborative sampling, according to an example embodiment. Reference is also made to FIGS. 1A-1D and 2 for purposes of the description of FIG. 3. Initially, at step 302, a set of data flows representing network traffic in network 110 is obtained (i.e., by the sampling system 112) based on sampling criteria. The network traffic includes communications to and from the computing nodes (i.e., computing nodes 230 and 240) in network 110, including communications between one or more computing nodes and one or more domains outside of the network 118 (i.e., domains 250, 255, and 260). Each data flow in the set of data flows includes a plurality of data packets and each of the packets includes information relating to the data flow. In many embodiments, the data flows are captured as NetFlow data; however, in some embodiments, the data flows may additionally or alternatively be obtained from proxy logs (such as those generated by proxy server/firewall 238). Although there are typically fewer proxy logs than NetFlow data (same network), the telemetry volumes are comparable due to dramatically higher average line/record size of proxy logs. Moreover, in some embodiments, the set of data flows may be obtained or collected in real time, such that the full set is obtained over a period of time. However, in other embodiments the set of data flows may be obtained at once, perhaps for a post-mortem analysis.

At step 304, the set of data flows obtained at step 302 is forwarded for correlation with a plurality of other sets of data flows from other networks 110 to generate global intelligence data. For example, in some embodiments (i.e., implementations 102 and 104), the set of data flows obtained at step 304 may be forwarded from a sampling system 112 to an IDS 114 associated with the network 110 from which the set of data flows was obtained. The IDS 114 may then consult or communicate with the correlation system 116, which may be centralized (i.e., implementation 102) or distributed (i.e., implementation 104) so that global intelligence data can be generated or updated. Alternatively, the set of data flows obtained at step 304 may be forwarded from a sampling system 112 directly to a correlation system 116, which, again, may be centralized (i.e., implementation 106) or distributed (i.e., implementations 108) so that global intelligence data can be generated or updated.

Notably, regardless of how the set of data flows is forwarded for correlation, the correlation system 116 can generate or update global intelligence data based on the set of data flows. Upon generating or updating the global intelligence data, the correlation system 116 may automatically ensure that every component or subsystem of the correlation system 116, whether centralized or distributed, has the most current global intelligence data. Moreover, once the global intelligence data is generated or updated, the correlation system 116 may automatically provide the generated or updated global intelligence data to any sampling systems 112 in the network environment (or provide the global intelligence data for automatic retrieval by every sampling system 112). Then, at step 306, sampling systems 112 can generate adjusted sampling criteria based on the global intelligence data.

At step 308 the sampling system 112 may utilize the adjusted sampling criteria to obtain a second set of data flows. This sample will be based on the most recent global intelligence data. That is, the second set of data flows is obtained with collaborative sampling, as is described in further detail below in connection with FIG. 4. This sample may then be used to further update the IDS 114 and/or correlation system 116 to continuously and iteratively update the global intelligence data and the sampling criteria, as indicated at arrow 310. This may also allow malicious network traffic to be continuously identified at all of the collaborating networks.

Figure 4:
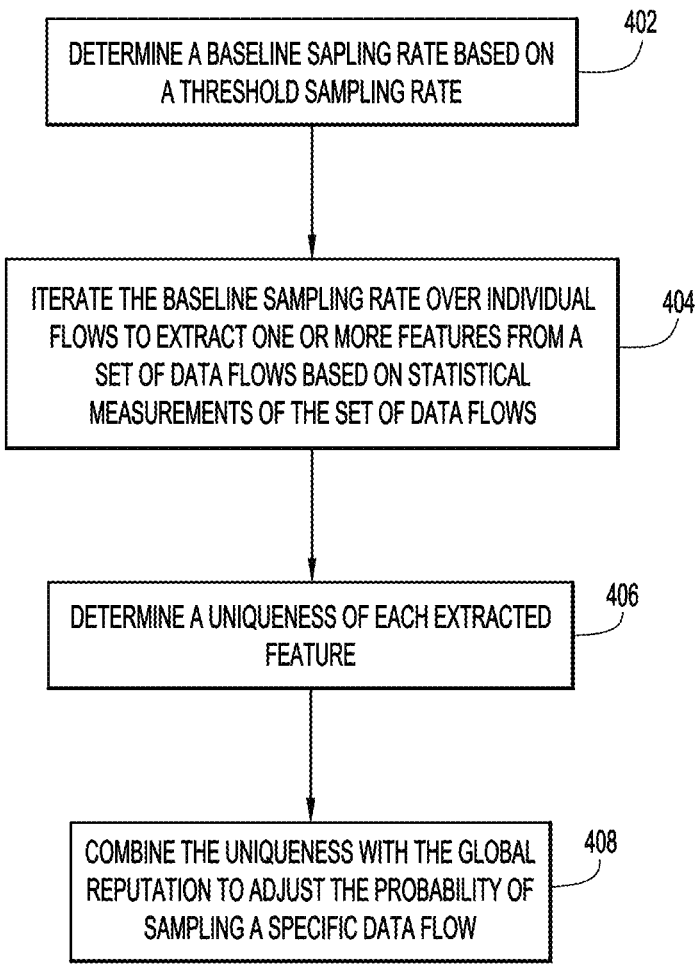
FIG. 4 is a flowchart illustrating a method for obtaining a sample of network traffic based on global intelligence data, according to an example embodiment.

Now referring to FIG. 4, a flowchart is now described of a method 400 for obtaining sets of data flows based on global intelligence (i.e., at step 310 above). That is, method 400 describes an example embodiment of collaborative sampling. Generally, the sampling algorithm adjusts the sampling rate of individual data flows (or other basic entities) according to the global intelligence to sample as much malicious traffic as possible. More specifically, the sampling algorithm weights features found in local network traffic based on global intelligence data so that data flows (i.e., connections) originating from bad-reputation servers, autonomous systems, or other such entities will be sampled with higher probability that connections from widely used services.

Initially, at step 402, a baseline sampling rate is determined based on a threshold sampling rate. The threshold sampling rate is the maximum rate at which an IDS 114 (or correlation system 116) may receive and process data and, thus, the maximum rate at which a sampling component 112 may sample data flows. The threshold sampling rate may be predetermined (i.e., one million data flows per minute) or determined dynamically based on processing at the IDS 114 (or correlation system 116). The baseline sampling rate is a ratio of the threshold sampling rate.

At step 404, the sampling rate is iterated over individual data flows to extract one or more features from a set of data flows based on statistical measurements of the set of data flows. Examples of features include count features and entropy features. Count features indicate a number of data flows that are related based on the statistical measurements, such as the number of flows with the same user, the number of flows directed towards the same hostname, etc. Meanwhile, entropy features indicate entropy of a certain statistical measurement over the set of data flows (i.e., how related flows differ). Generally, the features are based on statistical measurements of the set of data flows, such as: source Internet Protocol (IP) address of the data flow, destination IP address of the data flow, source port of the data flow, destination port of the data flow, protocol of the data flow, number of data packets transferred in the data flow, and timestamp of the data flow. For example, an entropy feature may indicate the entropy of bytes from a specific server IP address. Large feature values tend to indicate that the flows are related to visible and easily detectable network events, while smaller (or hidden) feature values tend to indicate that data flows are unique or rare and, thus, likely to be part of or associated with malicious communication channels. For example, if a data flow has a high count feature, this data flow is likely fairly common and, thus, likely not malicious. The features may be analyzed, at step 406, to determine the uniqueness of each feature. That is, the extracted features can be analyzed, at step 406, to identify unique features, which may often identify malicious data flows.

At step 408, the uniqueness of a feature associated with a specific flow is combined with reputation values included in the global intelligence data for that specific flow to adjust the probability of sampling the specific flow. That is, the features extracted from data flows at a particular network 110 are evaluated in view of global intelligence data generated from data from all networks 110 in a particular collaboration. More specifically, the correlation system 116 may provide a reputation value for every second level domain ($\tau^{(SLD)}$) for every server IP address ($\tau^{(IP)}$), and autonomous system ($\tau^{(AS)}$). For example, the value ($\tau^{(IP)}$)$\in[0, 1]$, where ($\tau^{(IP)}$)=0 means that the corresponding server IP address is frequently associated with malware (so the server IP has a very low reputation), while $\tau^{(IP)}\epsilon=1$ denotes a server IP with the highest possible reputation. These reputation values are combined with extracted features (i.e., statistical properties) of the flows (such as numbers, volumes, or entropy of features) to determine whether a particular feature, such as a unique feature, is known to identify malicious network traffic across multiple networks (i.e., does a data flow with a unique feature have a bad reputation?). The sampling may then be adjusted to sample the unique or rare data flows with bad reputations with higher probability (since such data flows are typically related to malicious behaviors), while redundant legitimate flows will be sampled with lower probability.

As a more specific explanation, a set of n features ($f_1 \ldots f_n$) may be defined in a particular set of data flows that will be used in the sampling method. Then, uniqueness of feature value $f_i(\varphi)$ (of a particular data flow $\varphi$) is computed from the current dataset based on a number of occurrences of a particular feature value as compared to all feature values of a particular feature $f_i$. The uniqueness is then combined with a global reputation for the feature provided by the correlation component (i.e., in global intelligence data). Based on this combination, the probability (in 1D for the i-th feature) that the collaborative sampling (i.e., at step 308) will sample a particular flow (φ) is defined as follows:

$$P_i(\varphi) = \begin{cases} s(\varphi) * \dfrac{1}{\tau^{(i)}(\varphi)} & f_i(\varphi) \leq \forall_\varphi : s(\varphi) \leq \tau^{(i)}(\varphi) \\ s(\varphi) * \dfrac{\log t}{\log f_i(\varphi)} & f_i(\varphi) > t \end{cases}$$

In this formula, s(φ) is a baseline sampling rate (as determined based on a ratio of the threshold sampling rate). $f_i(\varphi)$ is a value of an i-th feature extracted from flow φ and t is the threshold that defines a point in the distribution where the sampling method starts setting the probability proportionally to the size of the feature value. The higher the feature value, the lower the sampling rate assigned. $\tau^{(i)}(\varphi)$ represents the reputation of the i-th feature of flow φ (i.e., reputation of source IP address or domain). This way, the collaborative sampling can significantly boost the sampling rate of flows with bad reputations and/or flows with rare feature values. The sampling boost is only provided to the flows with feature values below the threshold, as emphasizing large number of redundant flows would be counterproductive.

Notably, condition s(φ)≤τ(φ) needs to be satisfied for all flows, otherwise the probability would exceed the interval [0,1]. If a reputation value of a flow exceeds the sampling rate s(φ), all reputation values will be scaled accordingly.

In at least some embodiments, the reputation values may be retrieved or received from a correlation system 116. Additionally or alternatively, the sampling component 112 may maintain reputation values and adjust the reputation values based on input from the correlation system 116. For example, in one embodiment, the algorithm may initially set all reputation values to a value of 1. Then, based on each update provided by the correlation system 116, the reputation value is either decreased, increased or held constant. The magnitude of an increase or decrease may depend on the number of other networks 110 reporting a particular domain (or other such location) as malicious and/or the confidence level the correlation system 114 has assigned to a determination of maliciousness (each of which may be indicated in global intelligence data). Generally, the more networks that report a malicious domain/autonomous system/etc., the more serious and widespread the infection is likely to be and, thus, a larger decrease in reputation is applied. On the other hand, a reputation of a particular domain (or other such location) can be increased when no infections are reported for a predetermined length of time.

Figure 5:
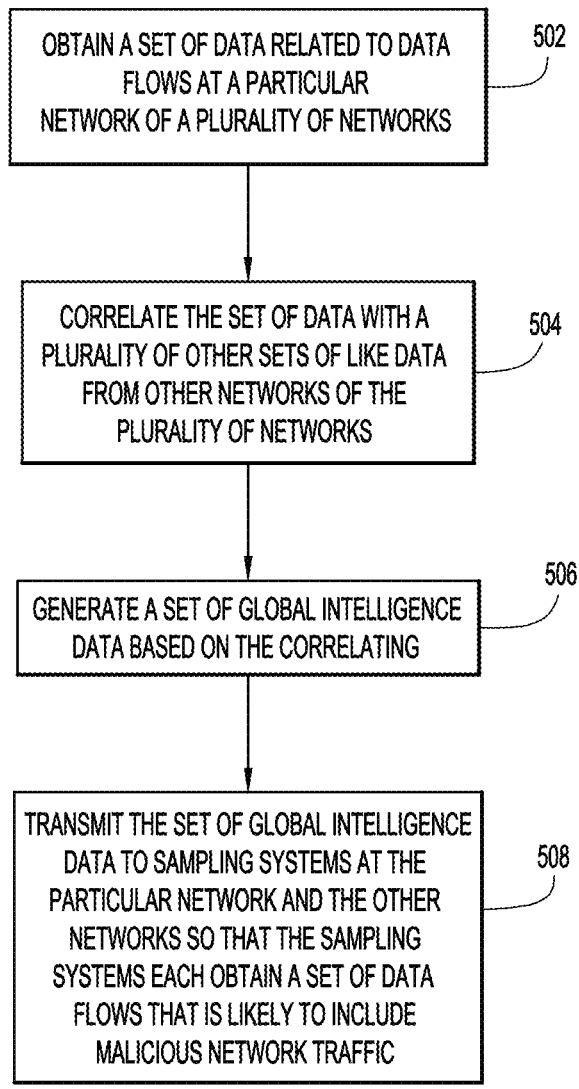
FIG. 5 is a high-level flowchart illustrating a process for identifying malicious network traffic based on collaborative sampling from the perspective of a collaboration system, according to an example embodiment.

Now turning to FIG. 5, a high-level flowchart is now described of a method 500 describing operations of a correlation system 116 during collaborative sampling, according to an example embodiment. Reference is also made to FIGS. 1A-1D for the description of FIG. 5. Initially, at step 502, the correlation system 116 obtains a set of data related to data flows at a particular network 110 of a plurality of networks participating in a collaboration. In some embodiments (i.e., implementations 102 and 104), the set of data may be a set of intrusion intelligence data received from an IDS 114 associated with a particular network 110. However, in other embodiments (i.e., implementations 106 and 108), the set of data may be a set of data flows or extracted features received from a sampling component 112 associated with a particular network 110.

At step 504, the set of data is correlated with sets of like data from other networks of the plurality of networks (i.e., data from an IDS 114 is compared to other data received from other IDS's 114 associated with other networks) to find similarities in the data. For example, the correlation may correlate the identification of a particular domain as malicious across multiple networks 110. In order to perform this correlation, the correlation system 116 may include any type of model or engine configured to consider various features, such as individual host names, server IP addresses, and second level domains. At step 506, global intelligence data is generated based on the correlating. This includes generating reputation scores for specific data flows, which may be incremented or decremented based on the correlating.

At step 508, the global intelligence data is transmitted to all sampling systems 112 in the implemented network environment so that the sampling systems 112 each obtain a set of data flows that is likely to include malicious network traffic. As is discussed above with respect to FIG. 4, the sampling systems 112 may each adjust sampling rates of certain data flows at their associated network 110 based on the reputation scores included in the global intelligence data.

Now turning to FIG. 6, diagram 600 illustrates a number of infected users that are detected over time with various sampling techniques, including the techniques presented herein. Line 602 depicts that actual number of infected users, while lines 604, 606, and 608 depict how many of these users were included in a sample taken of the network traffic data. Line 604 depicts a number of infected users captured with random sampling, line 606 depicts a number of users captured with adaptive sampling techniques applied at only a local network, and line 608 depicts the number of users captured with the collaborative sampling techniques presented herein, which, as mentioned repeatedly, utilize global intelligence data that is generated or maintained based on input from many networks.

As can be seen, the techniques provided herein are able to sample most of the network traffic related to the malicious infections (i.e. 95% or more), while random sampling or adaptive sampling running only at one network (i.e., lines 604 and 606) only captures about half as many infections. In diagram 600, each sampling technique utilized samples of the same size; the sample taken in accordance with the techniques presented herein simply captures more malicious network traffic within this sample size. However, due to the accuracy and efficiency of the techniques presented herein, in at least some embodiments, malicious network traffic can be captured in a sample that includes 5-10 times less overall network traffic (as compared to other sampling techniques). As is discussed above, once a sample is captured by the sampling techniques presented herein, the sample can be analyzed by an IDS to create new incidents and update the global intelligence. Consequently, a reduced overall sample size (including a large majority of malicious network traffic) may improve processing at the IDS (e.g., processing relating to network security). Moreover, since the global intelligence is iteratively updated, the sampling method will continue to update and the sampling will remain particularly effective. By comparison, other sampling techniques may continually sample at lower rates of effectiveness (i.e., capture lower percentages of malicious network traffic and a large amount of benign or safe network traffic) since these techniques are not iteratively updated based on global intelligence data.

Figure 7:
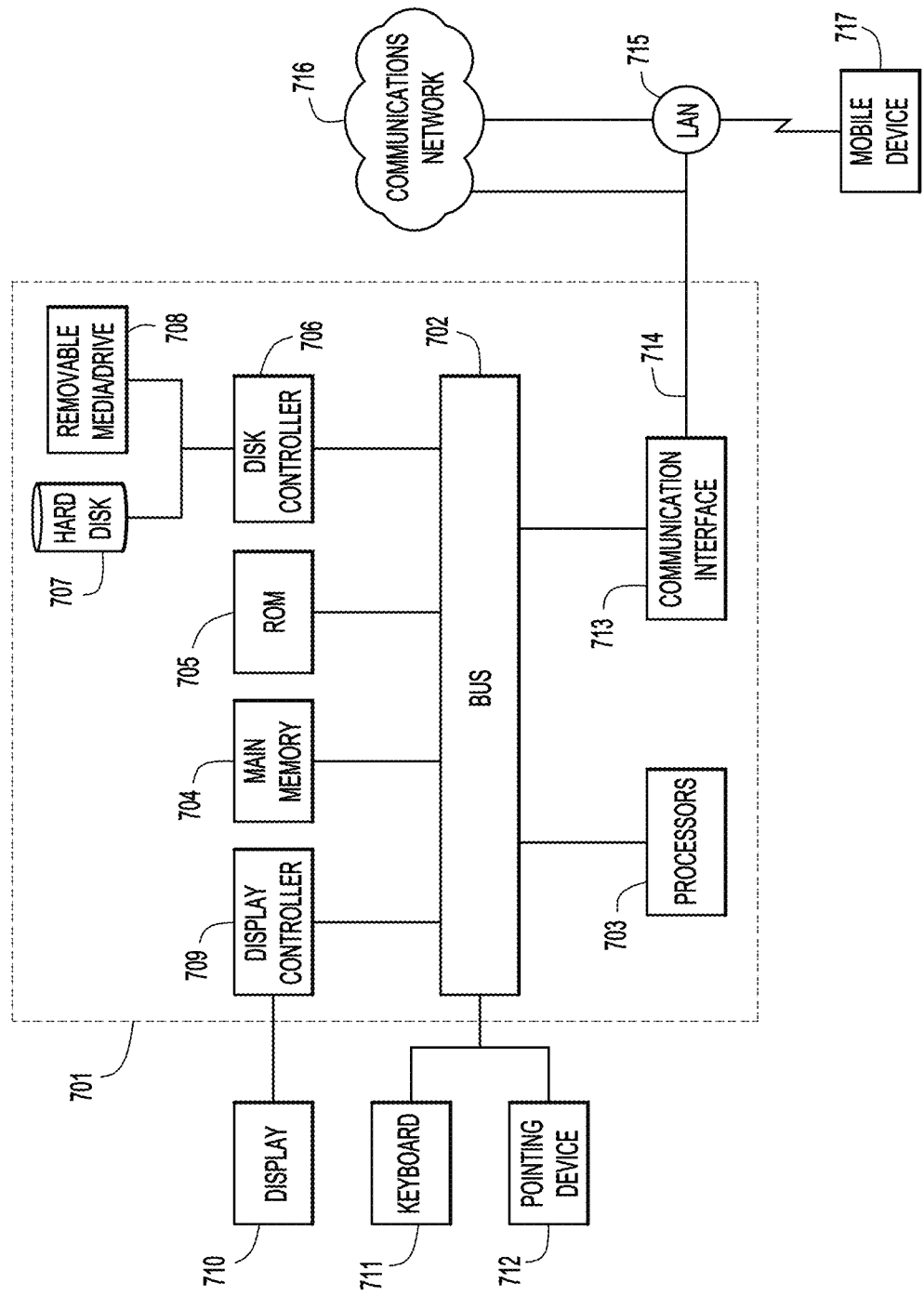
FIG. 7 is a block diagram depicting a computer system upon which the sampling system presented herein may be implemented, according to an example embodiment.

FIG. 7 illustrates a computer system 701 upon which the embodiments of the sampling system 110 presented herein may be implemented. However, computing system 701 is merely an example and, in other embodiments, sampling system 110 may also be a component or subsystem of any kind of detector without modifying the detector (and, thus, the detector may not even have knowledge the sampling system 1110). That is, the sampling system 110 can be easily integrated into a detector. This flexibility contributes to the flexibility of the implementation of the techniques as a whole, as discussed above in connection with FIGS. 1A-1D. That being said, the computer system 701 includes a bus 702 or other communication mechanism for communicating information, and a processor 703 coupled with the bus 702 for processing the information. While the figure shows a signal block 703 for a processor, it should be understood that the processors 703 represent a plurality of processing cores, each of which can perform separate processing. The computer system 701 also includes a main memory 704, such as a random access memory (RAM) or other dynamic storage device (i.e., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (i.e., programmable ROM (PROM), erasable PROM (EPROM), and electrically erasable PROM (EEPROM)) coupled to the bus 702 for storing static information and instructions for the processor 703. The computer system 701 also includes a disk controller 706 coupled to the bus 702 to control one or more storage devices for storing information and instructions, such as a magnetic hard disk 707, and a removable media drive 708 (i.e., floppy disk drive, read-only compact disc drive, read/write compact disc drive, compact disc jukebox, tape drive, and removable magneto-optical drive). The storage devices may be added to the computer system 701 using an appropriate device interface (i.e., small computer system interface (SCSI), integrated device electronics (IDE), enhanced-IDE (E-IDE), direct memory access (DMA), or ultra-DMA).

The computer system 701 may also include special purpose logic devices (i.e., application specific integrated circuits (ASICs)) or configurable logic devices (i.e., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a liquid crystal display (LCD), etc., for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (i.e., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (i.e., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (i.e., a LAN) or through equipment operated by a service provider, which provides communication services through a communications network 716. The local network 714 and the communications network 716 use, for example, electrical, electromagnetic, or optical signals that carry digital data streams, and the associated physical layer (i.e., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

As mentioned above in connection with FIG. 6, the techniques provided herein may provide a sample that captures nearly all malicious traffic in a particular network due at least in part to global intelligence data used to adjust sampling criteria (i.e., the probabilities with which certain data flows are sampled). The accuracy of the sampling techniques presented herein also enables the techniques to provide a significantly smaller overall sample, which may improve processing at any of the systems of components (i.e., the sampling system, correlation system, and IDS) involved in the techniques presented herein. More generally, the techniques provided herein provide a number of advantages. For example, techniques presented herein improve network security by improving monitoring, both in terms of accuracy and efficiency.

As a more specific example, the techniques presented herein decreases global re-usability of novel attacks (i.e., a novel attack attacking one network in the collaboration cannot be used to attack another network in the collaboration) at least because knowledge about novel attacks acquired from multiple networks is instantaneously propagated to other collaborating networks. Moreover, the flexibility of the techniques presented herein allows the techniques to be easily incorporated into various networks with various architectures. For example, enterprises with an on-premises IDS that is unable to process all telemetry could implement the techniques presented herein via a combination of the on-premises IDS and cloud-based solution. On the other hand, enterprises relying on cloud-based security systems may use the fully cloud-based collaborative sampling techniques described herein. Either way, the sampling techniques presented herein allow sophisticated and computationally intensive detection and classification algorithms to be deployed on large networks.

To summarize, in one form, a method is provided comprising: at a computing device having connectivity to a network, obtaining a first set of data flows, based on sampling criteria, that represents network traffic between one or more nodes in the network and one or more domains outside of the network, each data flow in the first set of data flows including a plurality of data packets; forwarding the first set of data flows for correlation with a plurality of other sets of data flows from other networks to generate global intelligence data; generating adjusted sampling criteria based on the global intelligence data; and obtaining a second set of data flows based on the adjusted sampling criteria.

In another form, a system is provided comprising: an intrusion detection subsystems associated with and having connectivity to a particular network of a plurality of networks, such that there is an instruction detection subsystem for each of the plurality of networks; a correlation subsystem configured to: correlate a first set of data flows that represents network traffic between one or more nodes in the particular network and one or more domains outside of the particular network with a plurality of other sets of data flows from other networks in the plurality of networks; and generate global intelligence data based on the correlating; and a sampling subsystem having connectivity to one or more of the plurality of networks and including a processor configured to: obtain the first set of data flows based on sampling criteria, wherein each data flow in the first set of data flows including a plurality of data packets; forward the first set of data flows to the correlation subsystem for the correlating; generate adjusted sampling criteria based on the global intelligence data; and obtain a second set of data flows based on the adjusted sampling criteria.

In yet another form, a non-transitory computer-readable storage media is provided encoded with software comprising computer executable instructions and when the software is executed operable to: obtain a first set of data flows, based on sampling criteria, that represents network traffic between one or more nodes in a network and one or more domains outside of the network, each data flow in the first set of data flows including a plurality of data packets; forward the first set of data flows for correlation with a plurality of other sets of data flows from other networks to generate global intelligence data; generate adjusted sampling criteria based on the global intelligence data; and obtain a second set of data flows based on the adjusted sampling criteria.

In still another form, an apparatus is provided comprising a network interface unit, and a processor, wherein the processor is configured to: obtain a first set of data flows, based on sampling criteria, that represents network traffic between one or more nodes in a network and one or more domains outside of the network, each data flow in the first set of data flows including a plurality of data packets; forward the first set of data flows for correlation with a plurality of other sets of data flows from other networks to generate global intelligence data; generate adjusted sampling criteria based on the global intelligence data; and obtain a second set of data flows based on the adjusted sampling criteria.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
at a computing device having connectivity to a network, obtaining a first set of data flows that represents network traffic between one or more nodes in the network and one or more domains outside of the network based on sampling criteria that weights features of the network traffic, including one or more count features and one or more entropy features, wherein each data flow in the first set of data flows includes a plurality of data packets;

forwarding the first set of data flows for correlation with a plurality of other sets of data flows from other networks to generate global intelligence data that is shared and collectively updated by the network and the other networks;

generating adjusted sampling criteria by adjusting the weights of the sampling criteria based on the global intelligence data so that the adjusted sampling criteria adjusts a probability of sampling a specific data flow in the network traffic based on a combination of a uniqueness of one or more of the features of the specific data flow and reputation values included in the global intelligence data; and obtaining a second set of data flows based on the adjusted sampling criteria.

2. The method of claim 1, wherein the forwarding further comprises:

forwarding the first set of data flows to an intrusion detection system associated with the network that generates a set of intrusion intelligence data to be correlated with intrusion intelligence data from other intrusion detection systems associated with the other networks to generate the global intelligence data.

3. The method of claim 1, wherein the forwarding further comprises:

forwarding the first set of data flows to a correlation system for the correlation with the plurality of other sets of data flows from the other networks to generate the global intelligence data.

4. The method of claim 1, further comprising:

updating the global intelligence data based on the second set of data flows.

5. The method of claim 1, wherein the generating of the adjusted sampling criteria further comprises:

extracting a reputation score for the specific data flow from the global intelligence data that is based on the reputation values.

6. The method of claim 1, wherein the features are determined based on statistical measurements that comprise at least one of:

source Internet Protocol (IP) address of a particular data flow, destination IP address of the particular data flow, source port of the particular data flow, destination port of the particular data flow, protocol of the particular data flow, number of data packets transferred in the particular data flow, and timestamp of the particular data flow.

7. The method of claim 6, wherein the count features indicate a number of data flows that are related based on the statistical measurements; and the entropy features indicate entropy of one of the statistical measurements over the first set of data flows.

8. The system of claim 1, wherein the features are determined based on statistical measurements that comprise at least one of:

source Internet Protocol (IP) address of a particular data flow, destination IP address of the particular data flow, source port of the particular data flow, destination port of the particular data flow, protocol of the particular data flow, number of data packets transferred in the particular data flow, and timestamp of the particular data flow.

9. The system of claim 8, wherein the count features indicate a number of data flows that are related based on the statistical measurements; and the entropy features indicate entropy of one of the statistical measurements over the first set of data flows.

10. A system comprising:

an intrusion detection subsystem associated with and having connectivity to a particular network of a plurality of networks, such that there is an instruction detection subsystem for each of the plurality of networks;

a correlation subsystem configured to:

correlate a first set of data flows that represents network traffic between one or more nodes in the particular network and one or more domains outside of the particular network with a plurality of other sets of data flows from other networks in the plurality of networks; and generate global intelligence data based on the correlating, wherein the global intelligence data is shared and collectively updated by the network and the other networks; and a sampling subsystem having connectivity to one or more of the plurality of networks and including a hardware processor configured to:

obtain the first set of data flows based on sampling criteria that weights features of the network traffic, including one or more count features and one or more entropy features, wherein each data flow in the first set of data flows including a plurality of data packets;

forward the first set of data flows to the correlation subsystem for the correlating;

generate adjusted sampling criteria by adjusting the weights of the sampling criteria based on the global intelligence data so that the adjusted sampling criteria adjusts a probability of sampling a specific data flow in the network traffic based on a combination of a uniqueness of one or more of the features of the specific data flow and reputation values included in the global intelligence data; and obtain a second set of data flows based on the adjusted sampling criteria.

11. The system of claim 10, wherein, in forwarding, the sampling subsystem is configured to:

forward the first set of data flows to the correlation subsystem via the intrusion detection subsystem that generates a set of intrusion intelligence data based on the first set of data; and the correlation subsystem performs the correlating by correlating the set of intrusion intelligence data with intrusion intelligence data from other intrusion detection systems associated with the other networks of the plurality of networks to generate the global intelligence data.

12. The system of claim 10, wherein, in forwarding, the sampling subsystem is configured to:

forward the first set of data flows directly to the correlation system for the correlation.

13. The system of claim 10, wherein the correlation subsystem is further configured to:

update the global intelligence data based on the second set of data flows.

14. The system of claim 10, wherein in generating of the adjusted sampling criteria, the sampling subsystem is further configured to:

extract a reputation score for the specific data flow from the global intelligence data that is based on the reputation values.

15. A non-transitory computer-readable storage media encoded with software comprising computer executable instructions and when the software is executed operable to:
obtain a first set of data flows that represents network traffic between one or more nodes in a network and one or more domains outside of the network based on sampling criteria that weights features of the network traffic, including one or more count features and one or more entropy features, wherein each data flow in the first set of data flows includes a plurality of data packets;
forward the first set of data flows for correlation with a plurality of other sets of data flows from other networks to generate global intelligence data that is shared and collectively updated by the network and the other networks;
generate adjusted sampling criteria by adjusting the weights of the sampling criteria based on the global intelligence data so that the adjusted sampling criteria adjusts a probability of sampling a specific data flow in the network traffic based on a combination of a uniqueness of one or more of the features of the specific data flow and reputation values included in the global intelligence data; and
obtain a second set of data flows based on the adjusted sampling criteria.

16. The non-transitory computer-readable storage media of claim 15, wherein the instructions operable to forward further comprise instructions operable to:
forward the first set of data flows to an intrusion detection system associated with the network that generates a set of intrusion intelligence data to be correlated with intrusion intelligence data from other intrusion detection systems associated with the other networks to generate the global intelligence data.

17. The non-transitory computer-readable storage media of claim 15, wherein the instructions operable to forward further comprise instructions operable to:
forward the first set of data flows to a correlation system for the correlation with the plurality of other sets of data flows from the other networks to generate the global intelligence data.

18. The non-transitory computer-readable storage media of claim 15, further comprising instructions operable to:
update the global intelligence data based on the second set of data flows.

19. The non-transitory computer-readable storage media of claim 15, wherein the instructions operable to generate the adjusted sampling criteria further comprise instructions operable to:
extract a reputation score for the specific data flow from the global intelligence data that is based on the reputation values.

20. The non-transitory computer-readable storage media of claim 15, wherein
the count features indicate a number of data flows that are related based on statistical measurements of the network traffic; and
the entropy features indicate entropy of one of the statistical measurements over the first set of data flows.

* * * * *